US012681194B2

(12) United States Patent
Niibe

(10) Patent No.: US 12,681,194 B2
(45) Date of Patent: Jul. 14, 2026

(54) CONTROLLING APPARATUS, RADIATION IMAGING SYSTEM, CONTROLLING METHOD OF CONTROLLING APPARATUS, AND COMPUTER-READABLE STORAGE MEDIUM

(71) Applicant: CANON KABUSHIKI KAISHA, Tokyo (JP)

(72) Inventor: Yusuke Niibe, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 252 days.

(21) Appl. No.: 18/651,914

(22) Filed: May 1, 2024

(65) Prior Publication Data

US 2024/0369720 A1 Nov. 7, 2024

(30) Foreign Application Priority Data

May 2, 2023 (JP) ................................ 2023-076125

(51) Int. Cl.

| | |
|---|---|
| ***G01T 1/02*** | (2006.01) |
| ***G01T 1/161*** | (2006.01) |
| ***G01T 1/17*** | (2006.01) |

(52) U.S. Cl.

CPC .................. *G01T 1/17* (2013.01); *G01T 1/02* (2013.01); *G01T 1/161* (2013.01)

(58) Field of Classification Search

CPC .. G01T 1/02; G01T 1/161; G01T 1/17; A61B 6/54; A61B 6/542; H04N 23/30; H04N 23/70; H04N 23/80

See application file for complete search history.

(56) References Cited

U.S. PATENT DOCUMENTS

| | | | | |
|---|---|---|---|---|
| 9,820,714 | B2 | 11/2017 | Sugahara et al. | |
| 12,226,252 | B2 * | 2/2025 | Gatayama .............. | G16H 50/50 |
| 2015/0250440 | A1 | 9/2015 | Sugahara et al. | |

FOREIGN PATENT DOCUMENTS

| | | |
|---|---|---|
| JP | 2014-100437 A | 6/2014 |

* cited by examiner

*Primary Examiner* — Jurie Yun
(74) *Attorney, Agent, or Firm* — VENABLE LLP

(57) ABSTRACT

A controlling apparatus capable of controlling radiation imaging by using auto exposure control of a radiation, the controlling apparatus comprising an estimating unit that estimates a radiation dose to be irradiated before the radiation is irradiated from a radiation generating apparatus, and a output unit that outputs information on an estimated radiation dose based on an output from estimating unit, wherein the information on the estimated radiation dose includes: in a case where the auto exposure control is used, information indicating that the auto exposure control is used; and, in a case where the auto exposure control is not used, at least one of the estimated radiation dose and a warning about the radiation.

14 Claims, 5 Drawing Sheets

CONTROLLING APPARATUS, RADIATION IMAGING SYSTEM, CONTROLLING METHOD OF CONTROLLING APPARATUS, AND COMPUTER-READABLE STORAGE MEDIUM

BACKGROUND OF THE INVENTION

Field of the Invention

The present disclosure relates to a controlling apparatus, a radiation imaging system, a controlling method of a controlling apparatus, and a computer-readable storage medium.

Description of the Related Art

In medical practice, auto exposure control (AEC) may be used to obtain a radiation image with proper image quality while reducing the amount of exposure to patients. The AEC is a control for detecting a dose of radiation by a dose detection sensor during irradiation of the radiation, and stopping the irradiation of radiation by a radiation source if the detected accumulated value of dose (accumulated dose) reaches a preset target dose. If the irradiation of radiation is stopped, a radiation imaging apparatus shifts an operation of a flat panel detector (FPD) from an accumulation operation to a readout operation, and obtains a radiation image. By optimizing the target dose of the AEC, the radiation image can be obtained with an appropriate amount of exposure to patients.

In addition, the Diagnostic Reference Level (DRL) has been formulated and published as an effort to justify and optimize the amount of exposure to the patients. The DRL specifies the exposure dose (DRL value) for a patient having normal weight and size for each condition such as a radiation imaging system, a technique, and an imaged site. If the median value of a typical dose in a medical facility exceeds the DRL value without a clinically justifiable reason, the optimization of amount of exposure to the patient can be facilitated by reviewing the optimization of the dose.

Japanese Patent Application Laid-Open No. 2014-100437 discloses a radiation imaging system that optimizes the exposure dose by estimating and outputting a radiation dose from an imaging condition of the radiation before the irradiation of radiation so that the operator recognizes, in advance, the radiation dose with which the patient will be exposed. Even if the operator sets an imaging condition with which an inappropriate exposure is assumed, since the operator can grasp the radiation dose before the radiation is irradiated, the radiation imaging system can be correct the imaging condition to an appropriate imaging condition.

However, the technique described in Japanese Patent Application Laid-Open No. 2014-100437 is a technique in which the operator optimizes the imaging condition in a case where the radiation imaging is not controlled by the AEC, and is not considered in a case where the radiation imaging is controlled by the AEC.

SUMMARY OF THE INVENTION

Therefore, one of the objects of one embodiment of the present disclosure is to provide a controlling apparatus capable of facilitating appropriate radiation dose management even if auto exposure control is performed.

A controlling apparatus according to one embodiment of the present disclosure is a controlling apparatus capable of controlling radiation imaging using auto exposure control of a radiation. The controlling apparatus comprises an estimating unit configured to estimate a radiation dose to be irradiated before the radiation is irradiated from a radiation generating apparatus, and an output unit configured to output information on an estimated radiation dose based on an output from the estimating unit. In a case where the auto exposure control is used, the information on the estimated radiation dose includes information indicating that the auto exposure control is used. In a case where the auto exposure control is not used, the information on the estimated radiation dose includes at least one of the estimated radiation dose and a warning about the radiation.

Further features of the present invention will become apparent from the following description of exemplary embodiments with reference to the attached drawings.

DESCRIPTION OF THE EMBODIMENTS

Embodiment

Figure 1:
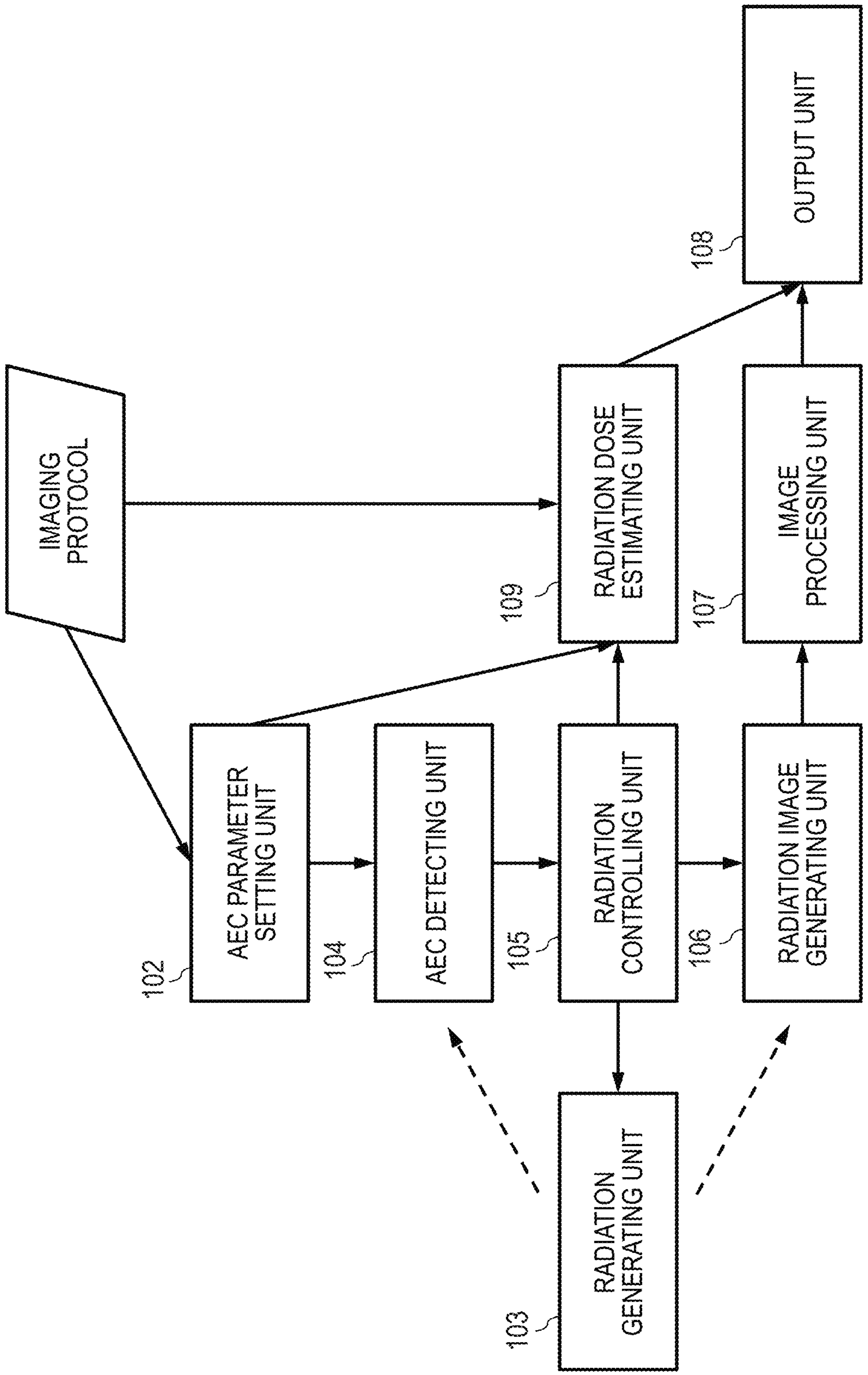
FIG. 1 is a block diagram for illustrating an example of a functional configuration of a radiation imaging system according to a first embodiment.

An exemplary embodiment for implementing the present disclosure will now be described in detail with reference to the accompanying drawings. However, the dimensions, materials, shapes, relative positions of components, and the like described in the following embodiments can be freely set and may be modified depending on the configuration of an apparatus to which the present disclosure is applied or various conditions. In addition, the following embodiments do not limit the claimed invention. Although multiple features are described in the embodiments, not all of these multiple features may be essential to the invention, and the multiple features may be freely combined. In the accompanying drawings, the same reference numerals are given to the same or similar structures, and duplicate descriptions are omitted.

According to an embodiment of the present disclosure, the above-mentioned problems can be solved. That is, in a case where radiation imaging is controlled by the AEC, the AEC may not terminate radiation irradiation according to an imaging condition because the weight or the body size of the patient are different from the assumption, or the irradiation time of the imaging condition is set longer than the appropriate value so that the irradiation of radiation is stopped by the AEC. Therefore, if the technology described in Japanese Patent Application Laid-Open No. 2014-100437 is applied to a radiation imaging using the AEC, the operator may be caused to recognize a radiation dose estimated based on an imaging condition which is different from the actual control of the irradiation of radiation by the AEC. According to the embodiment of the present disclosure, this problem can be solved. Hereinafter, the embodiment will be described.

A radiation imaging system described in the following embodiment may be one apparatus including a radiation sensor (radiation detecting apparatus) that receives radiation irradiated from a radiation generating apparatus to generate a radiation image, or may be configured so that at least one part thereof exists independently as another apparatus. The radiation may be an X-ray or another radiation. In the following embodiments, the term "radiation" may include X-rays as well as, for example, alpha-rays, beta-rays, gamma-rays, particle rays, and cosmic rays.

First Embodiment

Hereinafter, referring to FIG. 1 to FIG. 5D, a radiation imaging system, and a controlling apparatus for auto exposure control in radiation imaging according to the first embodiment of the present disclosure and a controlling method thereof will be described. FIG. 1 is a block diagram for illustrating a functional configuration example of the radiation imaging system in the present embodiment. The radiation imaging system includes an AEC parameter setting unit 102, a radiation generating unit 103, an AEC detecting unit 104, a radiation controlling unit 105, a radiation image generating unit 106, an image processing unit 107, an output unit 108, and a radiation dose estimating unit 109.

The AEC parameter setting unit 102 outputs a target dose used for the AEC using a set imaging protocol as an input. The target dose can be determined according to subject conditions such as an imaged site, sex, and age, from the viewpoint of diagnostic purposes and an amount of exposure. For example, in a case where a trunk is imaged, since a radiation such as X-ray is difficult to pass through the trunk, the radiation needs to be irradiated a lot. In that case, a target dose can be set high to increase the dose reaching the FPD. However, even in a case where the trunk is imaged, if the diagnosis allows noisy image quality, the target dose can be set low to reduce the irradiated dose to a subject. For example, the target dose may be determined in consideration of the standard radiation dose (DRL value) based on the DRL to reduce the irradiated dose. The target dose may be prepared in advance in association with the imaging protocol, or may be determined dynamically according to other conditions.

The radiation generating unit 103 generates a radiation using an irradiation signal from the radiation controlling unit 105 as an input.

The AEC detecting unit 104 outputs a radiation control signal using the radiation dose transmitted through subject and the target dose as an input. The radiation control signal may include an instruction to stop the irradiation of radiation.

The radiation controlling unit 105 outputs an irradiation stop signal and an image read signal using the radiation control signal as an input. The radiation generating unit 103 stops the irradiation of radiation in response to the irradiation stop signal from the radiation controlling unit 105. Furthermore, the radiation controlling unit 105 controls and outputs an imaging condition of the radiation irradiated from the radiation generating unit 103.

The radiation dose estimating unit 109 outputs a radiation dose (estimated radiation dose) estimated to be irradiated, using information on a radiation dose to be irradiated from the radiation generating unit 103 as an input. The information on the radiation dose includes, for example, the set imaging protocol, the target dose output from the AEC parameter setting unit 102, and the imaging condition set by the radiation controlling unit 105. The radiation dose estimating unit 109 may select to use all of this input information, or at least any of this input information, for the radiation dose estimation.

The radiation image generating unit 106 generates a radiation image in response to the radiation transmitted through the subject, and outputs the generated radiation image in response to the image readout signal from the radiation controlling unit 105.

The image processing unit 107 is an example of a processing unit that performs image processing on the radiation image obtained by the radiation imaging. The image processing unit 107 according to the first embodiment outputs an image-processed radiation image on which the image processing is performed using the radiation image and the image processing parameters as inputs.

The output unit 108 can output the image processed radiation image output from the image processing unit 107 and the radiation dose output from the radiation dose estimating unit 109 to a display unit or a display apparatus such as monitors, a storage apparatus device such as a hard disk, and a management system such as PACS. The PACS is an abbreviation of Picture Archiving and Communication Systems. The output unit 108 can also function as an example of a display controlling unit that controls display of a display unit.

Figure 2:
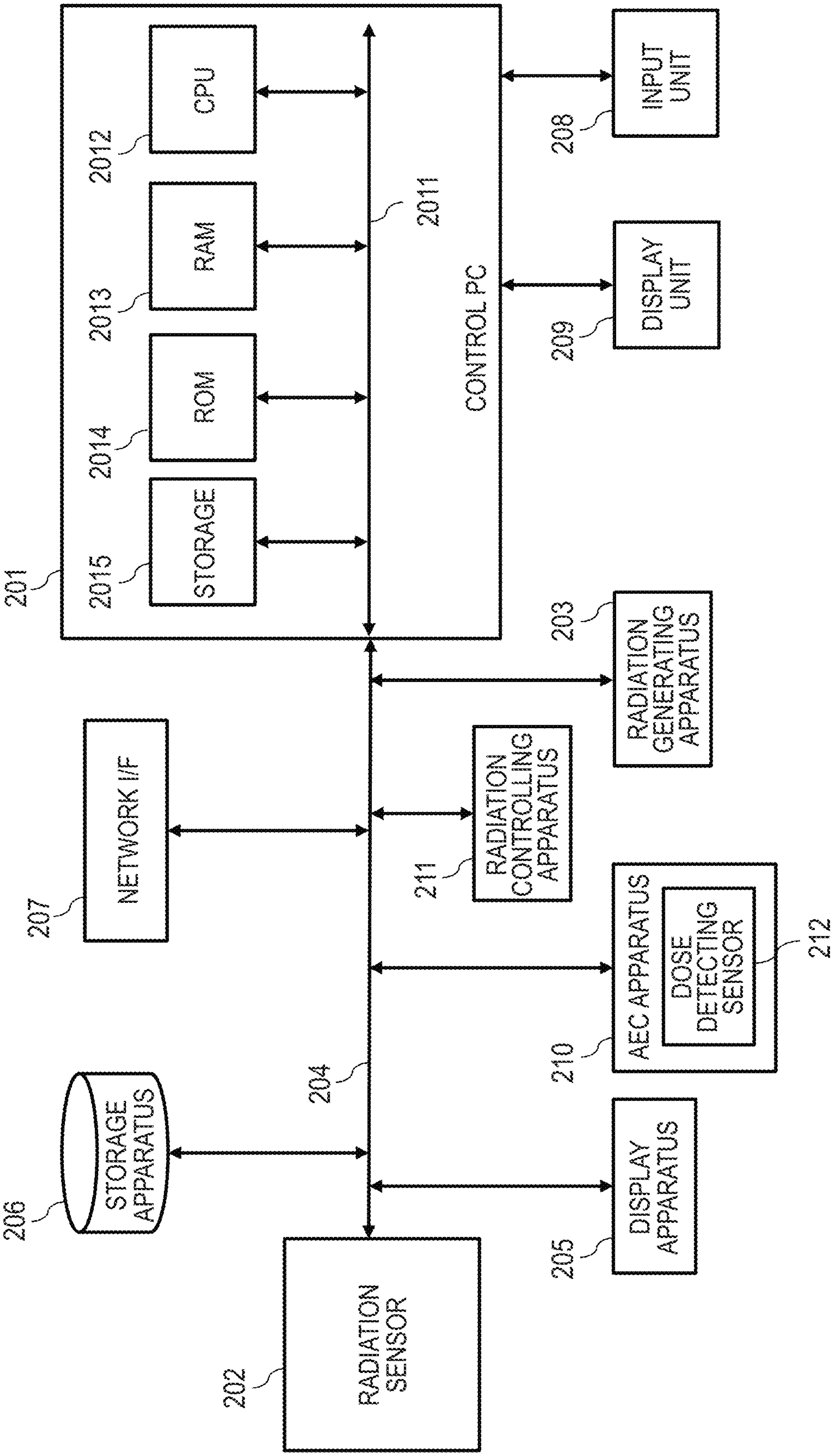
FIG. 2 is a block diagram for illustrating an example of a hardware configuration of the radiation imaging system according to the first embodiment.
Figure 3:
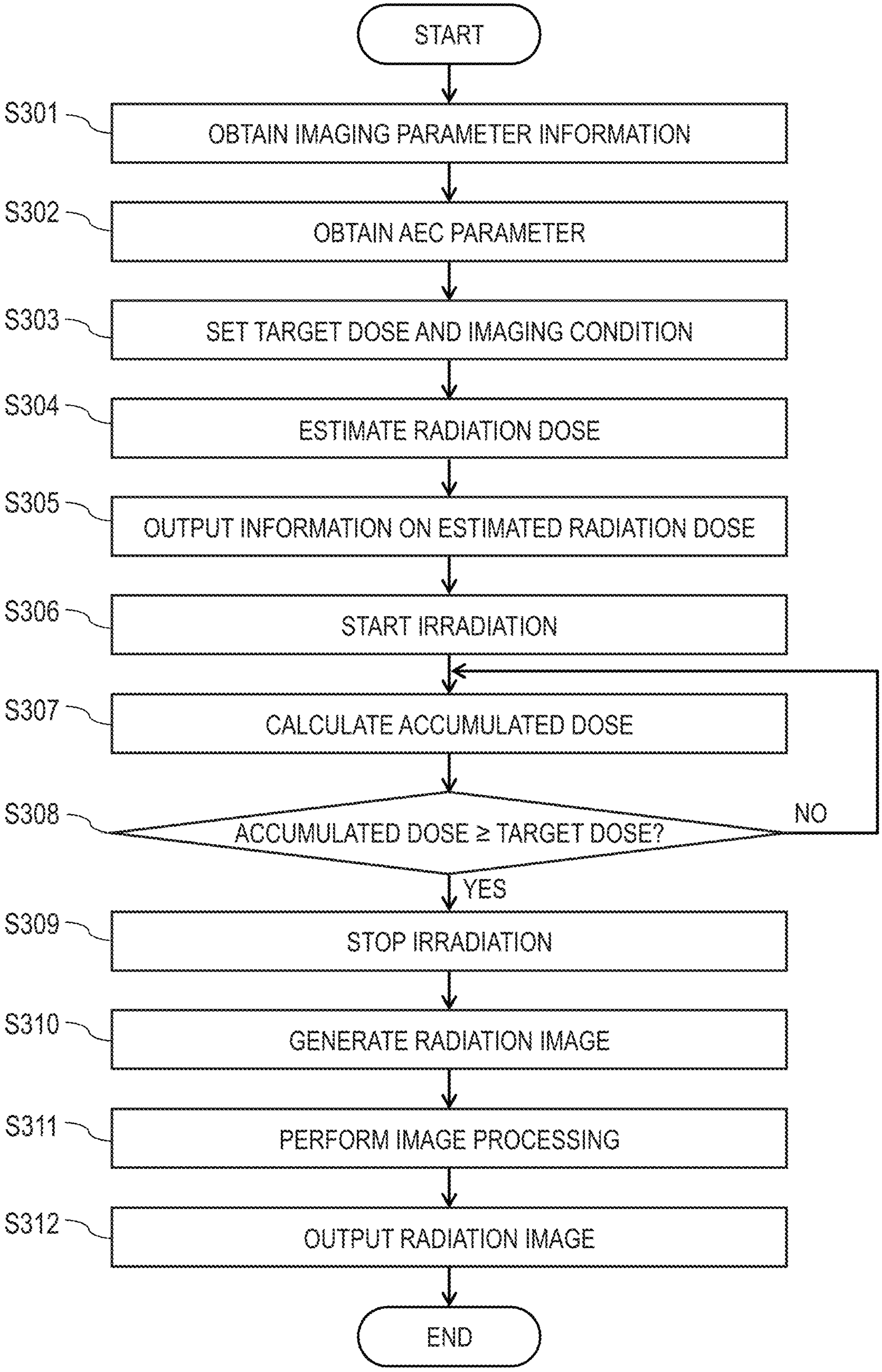
FIG. 3 is a flowchart for illustrating an imaging operation of a radiation image by the radiation imaging system.

An example of a hardware configuration for realizing the functional configuration shown in FIG. 1 will be described with reference to FIG. 2. FIG. 2 is a block diagram for illustrating an example of a hardware configuration of the radiation imaging system according to the first embodiment. The first embodiment shows a configuration in which a controlling apparatus for controlling the radiation imaging is realized using a personal computer (control PC 201). However, the controlling apparatus that controls the radiation imaging may be configured by a computer dedicated to the radiation imaging system.

The control PC 201 and a radiation sensor 202 are connected by a signal line 204 such as a cable of the gigabit ethernet. In a case of long length imaging using a plurality of radiation sensors, the plurality of radiation sensors can be connected to the signal line 204. The signal line 204 is not limited to the cable of the gigabit ethernet, but may be, for example, a cable of CAN (Controller Area Network), an optical fiber, or a serial communication cable. A radiation generating apparatus 203, a display apparatus 205, a storage apparatus 206, a network interface (I/F) 207, an AEC apparatus 210, and a radiation controlling apparatus 211 are also connected to the signal line 204. The display apparatus 205 may be configured using any monitor. The storage apparatus 206 may be configured using any storage medium such as a hard disk or a solid-state drive. The connection of each apparatus is not limited to a wired connection and may be a wireless connection.

In the control PC 201, a CPU (central processing unit) 2012, a RAM (Random Access Memory) 2013, a ROM (Read Only Memory) 2014, and a storage 2015 are connected to a bus 2011. The storage may be configured using any storage medium such as a hard disk or a solid-state drive. The control PC 201 and an input unit 208 are connected via USB or PS/2, and the control PC 201 and a display unit 209 are connected via VGA or DVI. The input unit 208 may be configured by an input device such as a mouse or keyboard, and the display unit 209 may be configured by any monitor. For example, the input unit 208 and the display unit 209 may be integrally configured by using a touch panel display or the like.

The control PC 201 can send a command to the radiation sensor 202, the display apparatus 205, the radiation controlling apparatus 211, and the like via the signal line 204. In the control PC 201, various processing contents are stored in the storage 2015 as software modules, and the CPU 2012 can load a necessary software module from the storage 2015 into the RAM 2013 and execute it.

The functions of the radiation generating unit 103 shown in FIG. 1 are realized by the radiation generating apparatus 203, the functions of the radiation image generating unit 106 are realized by the radiation sensor 202, and the functions of the radiation controlling unit 105 are realized by the radiation controlling apparatus 211. The radiation generating apparatus 203 may have a source such as a tube bulb for generating the radiation. The radiation sensor 202 may be configured using an FPD, for example. The radiation sensor 202 may be an indirect conversion type sensor that converts the radiation into visible light using a scintillator or the like and converts the visible light into an electric signal by a photoelectric conversion element, or may be a direct conversion type sensor that directly converts the incident radiation into an electric signal. The radiation controlling apparatus 211 may control the irradiation operation of radiation by the radiation generating apparatus 203 and the image reading operation by the radiation sensor 202, and may be configured using any computer, or any circuit such as a driver.

The functions of AEC detecting unit 104 are realized by the AEC apparatus 210. The AEC apparatus 210 has a dose detecting sensor 212 for detecting the irradiated radiation dose, and the AEC is performed based on a comparison between the radiation dose detected by the dose detecting sensor 212 and the target dose. The dose detection sensor 212 may be realized, for example, by an ion chamber or by a dose detection sensor included in the radiation sensor 202.

The control PC 201 is an example of a controlling apparatus that controls the radiation imaging using the radiation irradiated from the radiation generating apparatus 203 by using the AEC for controlling the radiation generating apparatus 203 by comparing the radiation dose to be irradiated from the radiation generating apparatus 203 and the target dose. The functions of the AEC parameter setting unit 102, the image processing unit 107, the output unit 108, and the radiation dose estimating unit 109 shown in FIG. 1 can be realized by the control PC 201. These functions can be realized by the CPU 2012 executing software modules stored in the storage 2015, but at least some of these functions may be realized by dedicated hardware, such as a circuit such as ASIC.

In the above description, a configuration in which the image processing unit 107 is realized by the control PC 201 is described. However, the image processing unit 107 may be realized as a dedicated image processing board. As the output destination of the radiation image by the output unit 108 shown in FIG. 1, for example, the display apparatus 205, the storage apparatus 206, or PACS connected via the signal line 204, or a display unit 209 connected to the control PC 201 may be used. The control PC 201 may be connected to any network such as an intranet in a hospital or the Internet via the network I/F 207. The control PC 201 may be connected to another management system, an external storage apparatus, a display apparatus, or the like via any network, to which the output unit 108 may output the radiation image.

Next, an operation of the radiation imaging using auto exposure control by the radiation imaging system according to the first embodiment having the above-described configuration will be described with reference to FIG. 3 to FIG. 5D.

When the operation of the radiation imaging using auto exposure control is started, in step S301, the control PC 201 obtains imaging parameter information from an imaging protocol set by the user. A plurality of imaging protocol are prepared, and the user selects them by using, for example, the input unit 208 according to an imaged site and an imaging technique. The control PC 201 can obtain the imaged site and the imaging technique from, for example, radiation Radiology Information Systems (RIS). The control PC 201 may automatically obtain the imaging protocol from the RIS or the like. The imaging protocol is a package of various parameters necessary for imaging, and the imaging protocol may include parameters (imaging conditions) necessary for the radiation controlling apparatus 211 to control the irradiation by the radiation generating apparatus 203. The imaging condition may include, for example, parameters such as a tube current, a tube voltage, irradiation time, tube current time product, a focus-subject distance, a focus-detector distance, a radiation quality filter, an irradiated area, an imaged site, sex, body size, weight, age, and the like.

Next, in steps S302 and S303, the AEC parameter setting unit 102 sets an appropriate target dose for the imaging protocol into the AEC apparatus 210. The AEC parameter setting unit 102 executing steps S302 and S303 is an example of a setting unit for setting a target dose used in the AEC.

Specifically, in step S302, the AEC parameter setting unit 102 obtains parameters (AEC parameters) relating to the AEC from the imaging protocol set in step S301. The AEC parameters include, for example, on/off of an AEC function, a target dose of the AEC, location and number of a lighting area of the AEC to be used, and the imaging condition. As noted above, the target dose is used by the AEC apparatus 210 to instruction to stop the irradiation of radiation.

In step S303, the AEC parameter setting unit 102 sets a target value (target dose) for the AEC. At this time, the AEC parameter setting unit 102 may correct the target dose included in the AEC parameter obtained in step S302 as necessary based on the imaging parameter information obtained in step S301 and the AEC parameter obtained in step S302.

If the AEC function is off, the AEC parameter setting unit 102 may set an invalid value as the target value of the AEC into the AEC detecting unit 104, or may notify the AEC detecting unit 104 that the AEC function is off by not setting the target value of the AEC. If the AEC function is off, the irradiation of radiation by the radiation generating unit 103 is controlled according to an imaging condition set by the radiation controlling unit 105.

In step S303, the radiation controlling unit 105 sets the imaging condition for controlling the irradiation by the radiation generating unit 103. The radiation controlling unit 105 can determine the imaging condition based on the imaging parameter information obtained in step S301 and the AEC parameter obtained in step S302. The imaging condition is also allowed to be changed by the radiation controlling unit 105 from the imaging condition included in the imaging protocol obtained in step S301.

Next, in step S304, the radiation dose estimating unit 109 estimates the radiation dose to be irradiated by the radiation generating unit 103. The radiation dose estimating unit 109 can estimate the radiation dose by using the imaging parameter information obtained in step S301, the AEC parameters obtained in step S302, and the target dose and the imaging condition set in step S303 as inputs. The radiation dose to be estimated includes, for example, at least one of dose area product, an absorbed dose, an irradiated dose, an air kerma, and a skin dose. Known methods can be used to estimate the radiation dose. The radiation dose may be estimated by converting from known physical property values by, for example, the Numerical Dose Determination (NDD) method, or may be estimated using a method calculated by, for example, the Monte Carlo method.

If the AEC function is off, the radiation dose estimating unit 109 estimates the radiation dose based on the imaging parameter information and the imaging condition, and outputs it to the output unit 108.

In contrast, if the AEC function is on, the radiation dose estimating unit 109 does not have to estimate the radiation dose. In a case where the radiation dose is not estimated, the radiation dose estimating unit 109 may output to the output unit 108 that the radiation dose is not estimated, or may output nothing. The radiation dose estimating unit 109 may output to the output unit 108 information indicating that the AEC function is on.

On the other hand, the radiation dose estimating unit 109 may estimate the radiation dose and output it to the output unit 108 even if the AEC function is on. In this case, the radiation dose estimating unit 109 can estimate the radiation dose based on the imaging parameter information, the AEC parameter, the target dose, and the imaging condition. In addition to the estimated radiation dose, the radiation dose estimating unit 109 also outputs information indicating that the AEC function is on to the output unit 108.

In step S305, the output unit 108 outputs information on the estimated radiation dose based on the output from the radiation dose estimating unit 109. Specifically, if the estimated radiation dose is output from the radiation dose estimating unit 109, the output unit 108 outputs the estimated radiation dose or a warning about the radiation as the information on the estimated radiation dose.

Further, if it is output from the radiation dose estimating unit 109 that the radiation dose is not estimated, if the information indicating that the AEC function is on is output from the radiation dose estimating unit 109, or if nothing is output from the radiation dose estimating unit 109, the output unit 108 outputs the information indicating that the AEC function is on as the information on the estimated radiation dose. Further, if the estimated radiation dose and the information indicating that the AEC function is on are output from the radiation dose estimating unit 109, the output unit 108 outputs the estimated radiation dose and the information indicating that the AEC function is on as the information on the estimated radiation dose. Thus, the output unit 108 can output the estimated radiation dose to indicate that the estimation accuracy is low.

The output destinations of the output unit 108 can include, for example, the PACS connected to the control PC 201 via the network interface 207 in addition to the display apparatus 205 and the display unit 209. The output unit 108 can control the display of the display apparatus 205 and display unit 209 based on the information on the estimated radiation dose.

An example in which the output unit 108 outputs the information on the estimated radiation dose to the display unit 209 if the AEC function is off will now be described. FIG. 4A to FIG. 4D show an example of a screen displayed on the display unit 209 in this case.

Figure 4A:
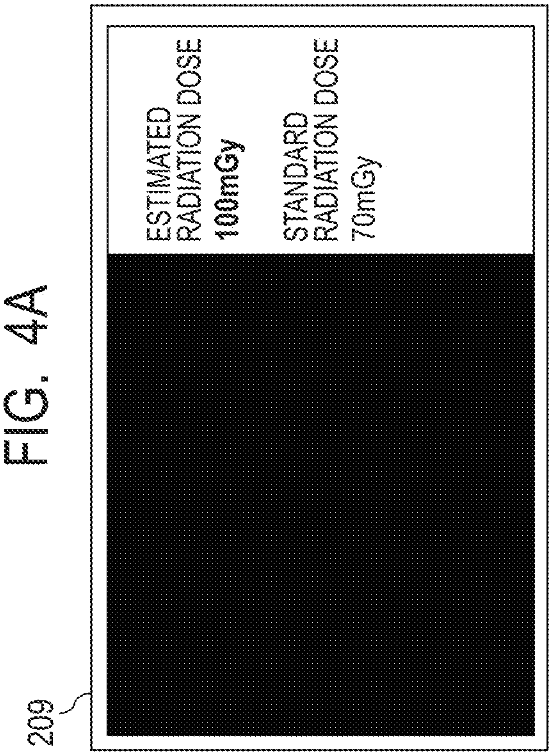
FIG. 4A is a diagram for illustrating an example of an output of a radiation dose when AEC is off, according to the first embodiment.

In the example shown in FIG. 4A, in addition to the estimated radiation dose estimated by the radiation dose estimating unit 109, a standard radiation dose (DRL value) determined from the imaging parameter information is displayed. By displaying both of the estimated radiation dose and the DRL value in this manner, the user can easily check whether the radiation dose when the radiation is irradiated under the present conditions exceeds the DRL value without a clinically justifiable reason. Therefore, the user can adjust the radiation dose to an optimal radiation dose before the radiation is irradiated to obtain an image. Thus, the control PC 201 can facilitate appropriate radiation dose management by the user. The DRL value may be determined from the imaging parameter value by the control PC 201.

In addition, the output unit 108 may control the display of the display unit 209 to include an expression to emphasize that the estimated radiation dose exceeds the DRL value in the present imaging condition if the estimated radiation dose output by the radiation dose estimating unit 109 exceeds the DRL value by a certain criterion. In this case, the output unit 108 can, for example, emphasize the display by changing user-identifiable elements such as the color, size, and typeface of letters in any combination. Further, as shown in FIG. 4B, the output unit 108 may cause an icon or expression indicating that the estimated radiation dose exceeds the DRL value to be displayed as the warning about the radiation, and may not cause the DRL value to be displayed directly.

Figure 4B:
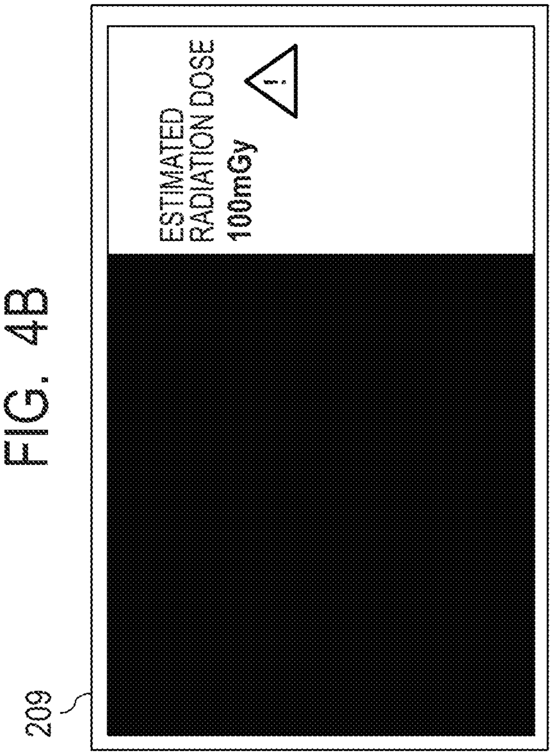
FIG. 4B is a diagram for illustrating an example of the output of the radiation dose when the AEC is off, according to the first embodiment.
Figure 4C:
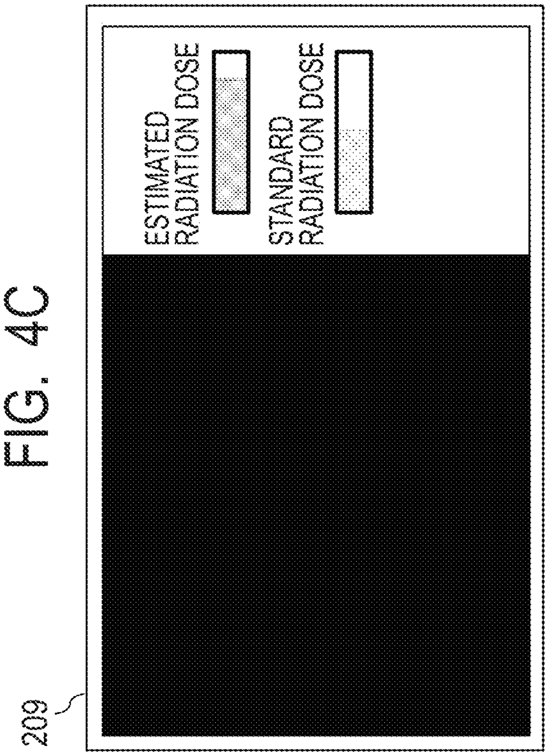
FIG. 4C is a diagram for illustrating an example of the output of the radiation dose when the AEC is off, according to the first embodiment.
Figure 4D:
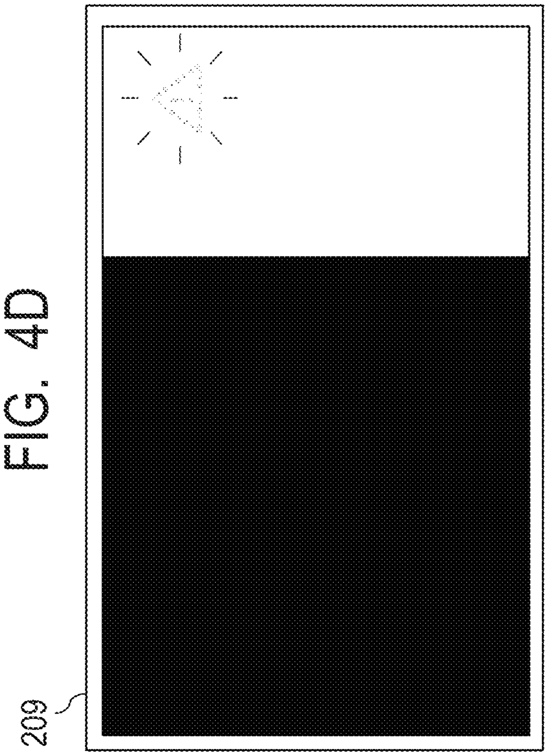
FIG. 4D is a diagram for illustrating an example of the output of the radiation dose when the AEC is off, according to the first embodiment.

Although FIG. 4A and FIG. 4B show examples of representing the radiation dose by characters, as shown in FIG. 4C, the radiation dose may be represented by elements other than characters, such as a bar and a gauge. In addition, as shown in FIG. 4D, an icon indicating that the estimated radiation dose exceeds the DRL value may be displayed as the warning about the radiation. In this case, an expression on display that attracts the user's attention may be added, for example, by changing the color of the icon and making it flash and display.

Next, an example in which the output unit 108 outputs the information on the estimated radiation dose to the display unit 209 if the AEC function is on will be described. FIG. 5A to FIG. 5D show an example of a screen displayed on the display unit 209 in this case.

Figure 5A:
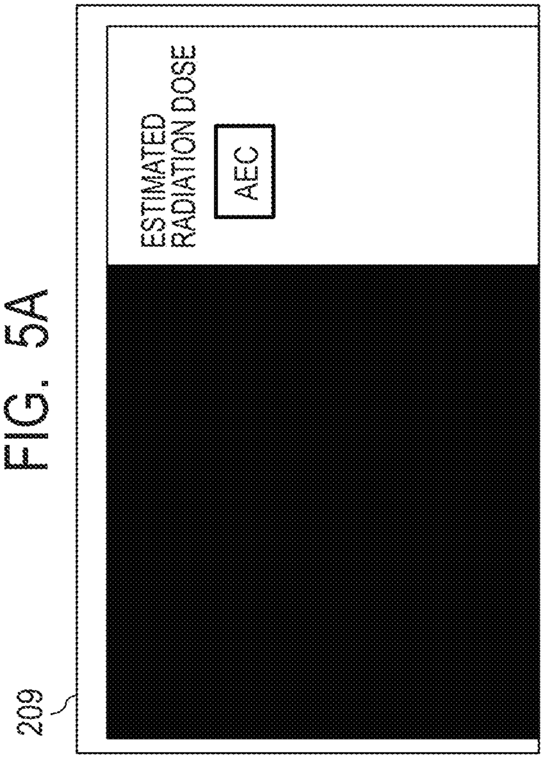
FIG. 5A is a diagram for illustrating an example of an output of the radiation dose when the AEC is on, according to the first embodiment.

In the example shown in FIG. 5A, in a case where the radiation dose estimating unit 109 does not output the estimated radiation dose, expression indicating that the AEC function is on is displayed instead of the estimated radiation dose. This is effective in a case where it is not appropriate to indicate the estimated radiation dose to the user if the AEC function is on.

For example, if the radiation dose in an appropriate range is set as the target dose of the AEC, the AEC controls the stop of the irradiation of radiation. Therefore, the user does not have to consider the relationship between the estimated radiation dose and the DRL value. In addition, since the AEC controls the stop of the irradiation of radiation, the estimation based on an input such as the imaging condition may be incorrect. In this case, by presenting the user with an estimated value that is different from the actual irradiated radiation dose, the user may be forced to change the imaging condition unnecessarily. In such a case, for example, the user may reduce the radiation dose below a radiation dose required for clinical use, and the radiation imaging may be performed using a radiation dose that is less than the radiation dose required for the clinical use, and re-imaging is required, thereby the radiation dose used for the imaging may be increased.

On the other hand, as shown in FIG. 5A, by displaying the expression indicating that the AEC function is on instead of the estimated radiation dose, it is possible to prevent the user from unnecessarily changing the imaging condition and to facilitate the appropriate radiation dose management by the user.

Figure 5B:
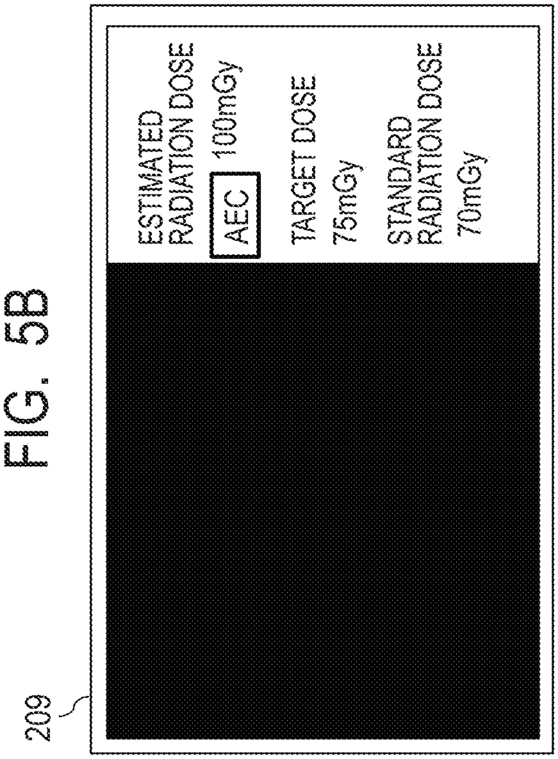
FIG. 5B is a diagram for illustrating an example of the output of the radiation dose when the AEC is on, according to the first embodiment.

In the example shown in FIG. 5B, in a case where the radiation dose estimating unit 109 outputs the information indicating that the AEC function is on together with the estimated radiation dose, an example of a screen displayed on the display unit 209 is shown. In this case, as shown in FIG. 5B, the output unit 108 may display each of the estimated radiation dose, the target dose of the AEC, and the standard radiation dose (DRL values) to the display unit 209.

By presenting that the DRL value is close to the target dose of the AEC, the user can recognize that the imaging will be controlled using the appropriate radiation dose by performing the imaging according to the target dose of the AEC. Further, by checking the relationship between the target dose of the AEC and the estimated radiation dose, the user can recognize the risk of the lack of the radiation dose caused by stopping the irradiation of radiation before the AEC stops the irradiation of radiation. In addition, the user can recognize the risk of the excess of the radiation dose, such as the amount of unnecessary radiation that will be irradiated if the AEC does not function sufficiently. For example, if the irradiation time in the imaging condition is set long according to the assumption that the AEC will stop the irradiation of radiation, the estimated radiation dose will become large. However, it corresponds to such a risk to set the irradiation time too long against the target dose, and therefore it is preferable to improve such a setting.

Figure 5C:
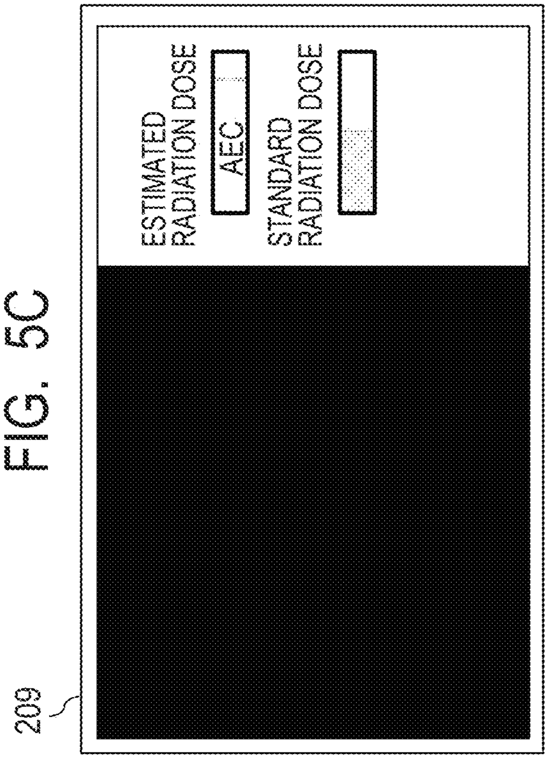
FIG. 5C is a diagram for illustrating an example of the output of the radiation dose when the AEC is on, according to the first embodiment.

FIG. 5C shows an example of display without using characters, but shows an example of display in a different expression from the example shown in FIG. 4C in the case where the AEC function is off. In the example shown in FIG. 5C, an expression indicating that the imaging is controlled by the AEC is shown in the gauge indicating the estimated radiation dose indicates, and even in this expression, the expression indicating that the AEC function is on is presented to the user.

Figure 5D:
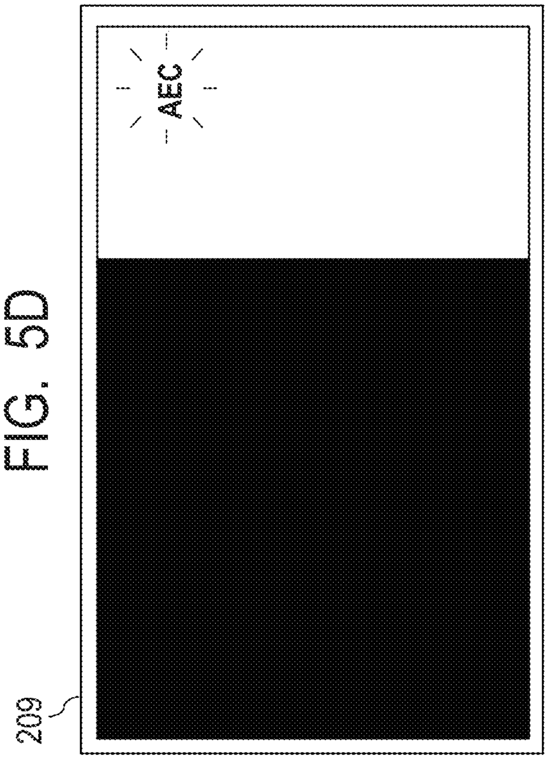
FIG. 5D is a diagram for illustrating an example of the output of the radiation dose when the AEC is on, according to the first embodiment.

FIG. 5D is an example displaying an icon indicating that the AEC function is on for the user. In this case, the output unit 108 may change or blink the color of the icon to emphasize that the AEC function is on, or may display the icon without emphasizing it because the irradiation of radiation is expected to stop at the target dose of the AEC if the AEC function is on.

FIG. 4A to FIG. 4D show the specific examples of the expression to be displayed by the display unit 209 in the case where the AEC function is off. FIG. 5A to FIG. 5D show the specific examples of the expression to be displayed by the display unit 209 in the case where the AEC function is on. However, the expression to be displayed by the display unit 209 is not limited thereto. In addition, the aspect of the output by the output unit 108 is not limited to that described above, and various changes and variations can be made without departing from the spirit and scope of the present disclosure. For example, the destination of the output by the output unit 108 may be the display apparatus 205 rather than the display unit 209, and the expression to be displayed may be realized by combining any identifiable expression. Furthermore, the output by the output unit 108 may not be limited to a visual expression, and an audio output device such as a buzzer (not shown) may be used to alert the user that the AEC function is on by sound.

Next, in step S306, the radiation controlling unit 105 outputs an irradiation signal to the radiation generating unit 103 upon detecting that the user presses the irradiation switch. Upon receiving the irradiation signal, the radiation generating unit 103 starts the irradiation of radiation. The irradiation switch may be directly connected to the radiation generating apparatus 203.

In step S307, the AEC detecting unit 104 accumulates the arrived dose of radiation and calculates accumulated dose. Thereafter, in step S308, the AEC detecting unit 104 compares the accumulated dose calculated in step S307 with the target dose set in step S303. In step S308, if the AEC detecting unit 104 determines that accumulated dose has not reached the corrected target dose, the process returns to step S307, and the AEC detecting unit 104 continues the calculation of accumulated dose. In this case, the AEC detecting unit 104 outputs a continuation request signal as a control request signal to the radiation controlling unit 105 to continue the irradiation of radiation by the radiation generating unit 103. If the radiation controlling unit 105 receives the continuation request signal from the AEC detecting unit 104, it makes the radiation generating unit 103 continue the irradiation of radiation.

On the other hand, if the AEC detecting unit 104 determines that accumulated dose has reached the target dose in step S308, the process transits to step S309. In step S309, the AEC detecting unit 104 outputs a stop request signal as the control request signal to the radiation controlling unit 105. If the radiation controlling unit 105 receives the stop request signal from the AEC detecting unit 104, the radiation controlling unit 105 transmits an irradiation stop signal to the radiation generating unit 103 to stop the irradiation of radiation.

The calculation of the accumulated dose in step S307 is repeated at a predetermined time interval (predetermined cycle). The end condition of the repetition is that the accumulated dose becomes equal to or greater than the corrected target dose, but when a metal having a high radiation absorption rate or the like is imaged in the area for calculating accumulated dose, the accumulated dose does not readily reach the corrected target dose. In this case, an excessive amount of radiation will be irradiated. Thus, a timeout may be added to the end condition of the repetition to prevent such excessive irradiation of radiation.

In step S310, the radiation controlling unit 105 transmits an image readout signal to the radiation image generating unit 106. Upon receiving the image readout signal from the radiation controlling unit 105, the radiation image generating unit 106 reads the image from the radiation sensor 202, generates a radiation image, and transmits the radiation image to the image processing unit 107.

In step S311, the image processing unit 107 performs image processing based on the set image processing parameters on the radiation image generated by the radiation image generating unit 106.

Finally, in step S312, the output unit 108 outputs the radiation image on which the image processing has been performed by the image processing unit 107. The destinations of the output by the output unit 108 include, for example, a PACS connected to the control PC 201 via the network interface 207 and the like in addition to the display apparatus 205 and the display unit 209. In this way, the imaged radiation image is subjected to the image processing and provided to a doctor.

As described above, the radiation imaging system according to the first embodiment includes the control PC 201, the radiation generating apparatus 203, and the radiation sensor 202. The control PC 201 functions as an example of a controlling apparatus capable of controlling radiation imaging using auto exposure control (AEC) of a radiation. The radiation generating apparatus 203 functions as an example of the radiation generating apparatus that irradiates the radiation. The radiation sensor 202 functions as an example of a radiation imaging apparatus that detects the irradiated radiation and generates a radiation image. The radiation imaging system also includes the dose detection sensor 212. The dose detection sensor 212 functions as an example of a sensor that detects a radiation dose irradiated from the radiation generating apparatus 203. The dose detection sensor 212 may also be included in the radiation sensor 202.

The control PC 201 includes the radiation dose estimating unit 109 and the output unit 108. The radiation dose estimating unit 109 can function as an example of an estimating unit that estimates the radiation dose to be irradiated before the radiation is irradiated from the radiation generating apparatus 203. The output unit 108 can function as an example of an output unit that outputs information on the estimated radiation dose based on the output from the radiation dose estimating unit 109. Here, the information on the estimated radiation dose includes information indicating that the auto exposure control is used in a case where the auto exposure control is used, and includes at least one of the estimated radiation dose and a warning about the radiation in a case where the auto exposure control is not used.

According to the above configuration, the output unit 108 changes the output based on whether the AEC function is on or off. Specifically, in the case where the AEC function is off, the output unit 108 outputs the estimated radiation dose estimated based on the imaging parameter and the imaging condition or a warning about the radiation. In this case, the control PC 201 outputs the estimated radiation dose or the warning about the radiation so that the user can recognize whether clinically unnecessary exposure has occurred. Therefore, the control PC 201 can facilitate the improvement of the radiation dose management to achieve the imaging with an optimal radiation dose.

Furthermore, in the case where the AEC function is on, the output unit 108 outputs that the radiation control by the AEC is performed. Thus, the user can recognize that the radiation dose to be actually irradiated may have a different value depending on the AEC. Therefore, it is possible to avoid misleading the user that clinically unnecessary exposure may occur in a case where the radiation dose estimated from the imaging condition and the like determined before the irradiation of radiation is different from the radiation dose to be actually irradiated, by stopping the irradiation of radiation at the target dose of the AEC. Therefore, it is possible to prevent the user from changing the imaging condition to be less than the clinically necessary radiation dose based on the misunderstanding, and to facilitate the appropriate radiation dose management so that the radiation imaging can be performed with an appropriate radiation dose.

Further, the output unit 108 causes the display unit to display the information on the estimated radiation dose. Here, the display unit 209 and the display apparatus 205 can function as examples of the display unit. According to such a configuration, the user can easily check the information on the estimated radiation dose, and thus, the appropriate radiation dose management by the user can be further facilitated.

The radiation dose estimating unit 109 may output at least one of dose area product, an absorbed dose, an irradiated dose, air kerma, and a skin dose as the estimated radiation dose. The kind of the estimated radiation dose may be freely set according to the desired configuration.

Also, the radiation dose estimating unit 109 may not estimate the radiation dose in a case where the auto exposure control is used. In this case, since the estimation of the radiation dose is not performed, the load of processing can be reduced and the processing speed can be improved.

Furthermore, the radiation dose estimating unit 109 may estimate the radiation dose even if the auto exposure control is used. In this case, the information on the estimated radiation dose may further include the estimated radiation dose. According to this configuration, in the case where the auto exposure control is used, the estimated radiation dose and information indicating that the auto exposure control is used are output. Therefore, the user can recognize that the estimation accuracy is low while checking the estimated radiation dose. Thus, it is possible to prevent the user from changing the imaging condition to be less than the clinically necessary radiation dose based on the misunderstanding, and to facilitate the appropriate radiation dose management so that the radiation imaging can be performed with the appropriate radiation dose. In addition, the user can recognize the risk of radiation dose excess, such as the amount of unnecessary radiation that will be irradiated if the AEC does not function sufficiently.

The radiation dose estimating unit 109 may estimate the radiation dose based on the target dose of the auto exposure control, in the case where the auto exposure control is used. Further, the radiation dose estimating unit 109 may estimate the radiation dose based on the imaging condition including at least one of a tube current, a tube voltage, irradiation time, tube current time product, a focus-subject distance, a focus-detector distance, an imaged site, a radiation quality filter, and an irradiated area of the radiation irradiated from the radiation generating apparatus 203.

The information on the estimated radiation dose may include the reference dose determined based on at least one of an imaged site, body weight, body size, age, and sex of the subject to which the radiation is irradiated. In addition, in a case where the estimated radiation dose exceeds the reference dose, the information on the estimated radiation dose may include at least one of an expression emphasizing that the estimated radiation dose exceeds the reference dose and a warning on the radiation. In this case, by presenting the information on the estimated radiation dose, the user can recognize whether clinically unnecessary exposure has occurred, and the improvement of the radiation dose management can be facilitated to achieve the radiation imaging with an optimal radiation dose.

The auto exposure control may include controlling the radiation generating apparatus 203 based on the comparison between the radiation dose to be irradiated from the radiation generating apparatus 203 and the target dose. More specifically, the auto exposure control may be performed based on a comparison between the radiation dose detected by the dose detection sensor 212 that detects the radiation dose irradiated from the radiation generating apparatus 203 and the target dose.

In the above embodiment, still image imaging has been described. However, the present disclosure is not limited thereto. The methods of the estimation and the output of the radiation dose described above may be applied to a dose control configuration used in, for example, a fluoroscopic apparatus for imaging a moving image. For example, the same effect can be obtained by applying the same method to the fluoroscopic device.

According to the above embodiments of the present disclosure, the appropriate radiation dose management can be facilitated even if the auto exposure control is performed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The processor or circuit may include a central processing unit (CPU), a microprocessing unit (MPU), a graphics processing unit (GPU), an application specific integrated circuit (ASIC), or a field programmable gateway (FPGA). The processor or circuit may also include a digital signal processor (DSP), a data flow processor (DFP), or a neural processing unit (NPU).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-076125, filed May 2, 2023, which is hereby incorporated by reference herein in its entirety.

What is claimed is:

1. A controlling apparatus capable of controlling a radiation imaging using auto exposure control of a radiation, the controlling apparatus comprising:

an estimating unit configured to estimate a radiation dose to be irradiated before the radiation is irradiated from a radiation generating apparatus; and an output unit configured to output information on an estimated radiation dose based on an output from the estimating unit, wherein the information on the estimated radiation dose includes:

in a case where the auto exposure control is used, information indicating that the auto exposure control is used; and in a case where the auto exposure control is not used, at least one of the estimated radiation dose and a warning about the radiation.

2. The controlling apparatus according to claim 1, wherein the output unit is configured to cause a display unit to display the information on the estimated radiation dose.

3. The controlling apparatus according to claim 1, wherein the estimating unit is configured to output at least one of dose area product, an absorbed dose, an irradiated dose, air kerma, and a skin dose as the estimated radiation dose.

4. The controlling apparatus according to claim 1, wherein the estimating unit is configured not to estimate the radiation dose in the case where the auto exposure control is used.

5. The controlling apparatus according to claim 1, wherein: the estimating unit is configured to estimate the radiation dose even in the case where the auto exposure control is used; and in the case where the auto exposure control is used, the information on the estimated radiation dose further includes the estimated radiation dose.

6. The controlling apparatus according to claim 5, wherein the estimating unit is configured to estimate the radiation dose based on a target dose of the auto exposure control.

7. The controlling apparatus according to claim 1, wherein estimating unit is configured to estimate the radiation dose based on an imaging condition including at least one of a tube current, a tube voltage, irradiation time, tube current time product, a focus-subject distance, a focus-detector distance, an imaged site, a radiation quality filter, and an irradiated area of the radiation irradiated from the radiation generating apparatus.

8. The controlling apparatus according to claim 1, wherein the information on the estimated radiation dose further includes a reference dose determined based on at least one of an imaged site, body weight, body size, age, and sex of a subject to which the radiation is irradiated.

9. The controlling apparatus according to claim 1, wherein if the estimated radiation dose exceeds a reference dose determined based on at least one of an imaged site, body weight, body size, age, and sex of a subject to which the radiation is irradiated, the information on the estimated radiation dose includes at least one of an expression emphasizing that the estimated radiation dose exceeds the reference dose and the warning about the radiation.

10. The controlling apparatus according to claim 1, wherein the auto exposure control includes controlling the radiation generating apparatus based on a comparison between the radiation dose to be irradiated from the radiation generating apparatus and a target dose.

11. A radiation imaging system comprising:

the controlling apparatus according to claim 1; and a radiation imaging apparatus arranged to detect a radiation irradiated from a radiation generating apparatus and generate a radiation image.

12. The radiation imaging system according to claim 11, wherein:

the auto exposure control is performed based on a comparison between radiation dose detected by a sensor arranged to detect the radiation dose irradiated from the radiation generating apparatus and a target dose; and the sensor is included in the radiation imaging apparatus.

13. A controlling method of a controlling apparatus capable of controlling radiation imaging using auto exposure control of a radiation, the controlling method comprising:

estimating a radiation dose to be irradiated before the radiation is irradiated from a radiation generating apparatus; and outputting information on the estimated radiation dose based on an output of the estimating, wherein the information on the estimated radiation dose includes:

in a case where the auto exposure control is used, information indicating that the auto exposure control is used; and in a case where the auto exposure control is not used, at least one of the estimated radiation dose and a warning about the radiation.

14. A non-transitory computer-readable storage medium having stored thereon a program, for causing, when executed by a computer, the computer to execute respective steps of the controlling method according to claim 13.

* * * * *